United States Patent
McGrew

(10) Patent No.: US 7,582,269 B2
(45) Date of Patent: Sep. 1, 2009

(54) THERMALLY AUTOGENOUS SUBSURFACE CHEMICAL REACTOR AND METHOD

(75) Inventor: Jay L. McGrew, Golden, CO (US)

(73) Assignee: Vertical Tube Reactor, LLC, Golden, CO (US)

( * ) Notice: Subject to any disclaimer, the term of this patent is extended or adjusted under 35 U.S.C. 154(b) by 427 days.

(21) Appl. No.: 11/162,816

(22) Filed: Sep. 23, 2005

(65) Prior Publication Data
US 2007/0071660 A1 Mar. 29, 2007

(51) Int. Cl.
- B01J 8/04 (2006.01)
- B09B 3/00 (2006.01)
- F28D 21/00 (2006.01)
- C02F 1/68 (2006.01)
- E21B 36/00 (2006.01)

(52) U.S. Cl. .......... 422/194; 422/184.1; 422/193; 422/196; 422/197; 422/204; 210/749; 210/752; 210/761; 166/61

(58) Field of Classification Search .......... 422/184.1, 422/193, 194, 196, 197, 198, 204; 210/749, 210/752, 761; 166/61
See application file for complete search history.

(56) References Cited

U.S. PATENT DOCUMENTS

| | | | |
|---|---|---|---|
| 4,272,383 A * | 6/1981 | McGrew | 210/741 |
| 4,671,351 A | 6/1987 | Rappe | |
| 4,774,006 A | 9/1988 | Kaufmann | |
| 4,803,054 A * | 2/1989 | Sillerud et al. | 422/109 |
| 5,008,085 A | 4/1991 | Bain et al. | |
| 2004/0144019 A1 * | 7/2004 | Nicklin et al. | 44/626 |

* cited by examiner

*Primary Examiner*—Walter D Griffin
*Assistant Examiner*—Lessanework T Seifu
(74) *Attorney, Agent, or Firm*—Ancel W. Lewis, Jr.

(57) ABSTRACT

A subsurface thermally autogenous reactor and method has downgoing and upgoing flow passages connected at the bottom to form a U-tube and in heat exchange relation to each other. The downgoing and upgoing flow passages each have an upper heat exchange section and a lower reaction section. An air injection system injects air into the downgoing flow passage between the heat exchange and reaction sections. The cross sectional area of the upgoing heat exchange section is greater than the cross sectional area of the downgoing heat exchange section to balance the downgoing and upgoing flow velocities. The downgoing heat exchange section has multiple tubes to increase the heat transfer area.

19 Claims, 3 Drawing Sheets

THERMALLY AUTOGENOUS SUBSURFACE CHEMICAL REACTOR AND METHOD

TECHNICAL FIELD

The present invention relates to effecting chemical reactions, and more particularly to a thermally autogenous subsurface reactor and method suitable for effecting wet oxidation.

BACKGROUND ART

Many chemical reactions can be accelerated under high pressure, high temperature conditions. Generally apparatus for generating high pressures and temperatures require high pressure pumps and vessels. Such apparatus is relatively complex, expensive and hazardous due to the abrasive nature of most aqueous waste.

Apparatus with subsurface, vertical downgoing and upgoing flow passages connected together at the bottom to form a long U-tube use a hydrostatic column to generate high pressures for accelerating chemical reactions. Generally these reactors consist of a pair of concentric, cylindrical, vertical tubes that extend deep underground. The reactants pumped into the top of one tube flow down that tube to the bottom, up the other tube and out the top of the other tube. In these reactors the downgoing and upgoing tube are generally in heat exchange relation to each other so that heat from the reaction in the up flowing fluid heats the down flowing fluid.

U.S. Pat. No. 4,272,383 to the present applicant, incorporated herein by reference, discloses such a reactor and method particularly suitable for reacting waste streams such as sewage sludge, animal waste and other oxidizable fluids. In the disclosed apparatus, air was injected at about ground level in the form of "Taylor bubbles" and a heat exchanger in the reaction zone in the lower portion of the reactor controlled the temperature. At a pressure above 135 psi and a temperature greater than 350° F., these waste streams are hydrolyzed, breaking down the organic components into lighter molecular weight molecules. With sufficient temperature, pressure, time and oxygen, the organic molecules will essentially convert to carbon dioxide, water and heat.

In prior known vertical subsurface reactors the heat transferred from the up flowing fluid to the down flowing fluid was insufficient for the reaction to be self-sustaining or thermally autogenous. In these reactors, heat was continually added through the heat exchanger to sustain the reaction or the injected air was replaced with liquid oxygen to increase heat recovery, significantly increasing costs and safety concerns.

DISCLOSURE OF THE INVENTION

A subsurface, thermally autogenous reactor and method includes downgoing means defining a downgoing flow passage and an upgoing means defining an upgoing flow passage in heat exchange relation to the downgoing means. The downgoing and upgoing means connect at the bottom to form a U-tube structure. The downgoing means has an upper downgoing heat exchange section, an intermediate air injection section and a lower downgoing reaction section, and the upgoing means has upgoing heat exchange and upgoing reaction sections that are substantially coextensive with the downgoing heat exchange section and the downgoing reaction section, respectively. The cross sectional area of the upgoing heat exchange section is greater than the cross sectional area of the downgoing heat exchange section. The ratio of the cross sectional areas of the upgoing heat exchange section to the downgoing heat exchange section depends on the chemical oxygen demand (COD) of the fluid for which the reactor is designed. Air is injected into the air injection section of the downgoing means, at a selected depth, between the downgoing heat exchange and reaction sections. The downgoing and upgoing heat exchange sections are configured with greater heat exchange surface area than the heat exchange surface area of single concentric tubes. The greater cross sectional area of the upgoing heat exchange section decreases upgoing fluid flow velocity. The decreased velocity of the upgoing fluid flow and the increased heat exchange area improve heat transfer between the downgoing and upgoing means, enabling the reactor to be thermally autogenous or self-sustaining.

The method includes the steps of providing a downgoing flow passage with a downgoing heat exchange section, an air injection section and a downgoing reaction section, providing an upgoing flow passage with an upgoing heat exchange sections and an upgoing reaction section, flowing fluid down the downgoing flow passage and up the upgoing flow passage, reacting the fluid in the downgoing reaction section and the upgoing reaction section, and transferring heat from fluid in the upgoing heat exchange section to fluid in the downgoing heat exchange section sufficient to sustain the step of reacting. The upgoing heat exchange section is larger than the downgoing heat exchange section. The reactor and method are capable of producing and recovering sufficient heat to eliminate the need for liquid oxygen or added thermal energy.

BRIEF DESCRIPTION OF THE DRAWINGS

Details of this invention are described in connection with the accompanying drawings that bear similar reference numerals in which.

DETAILED DESCRIPTION OF THE INVENTION

Figures 1, 2:
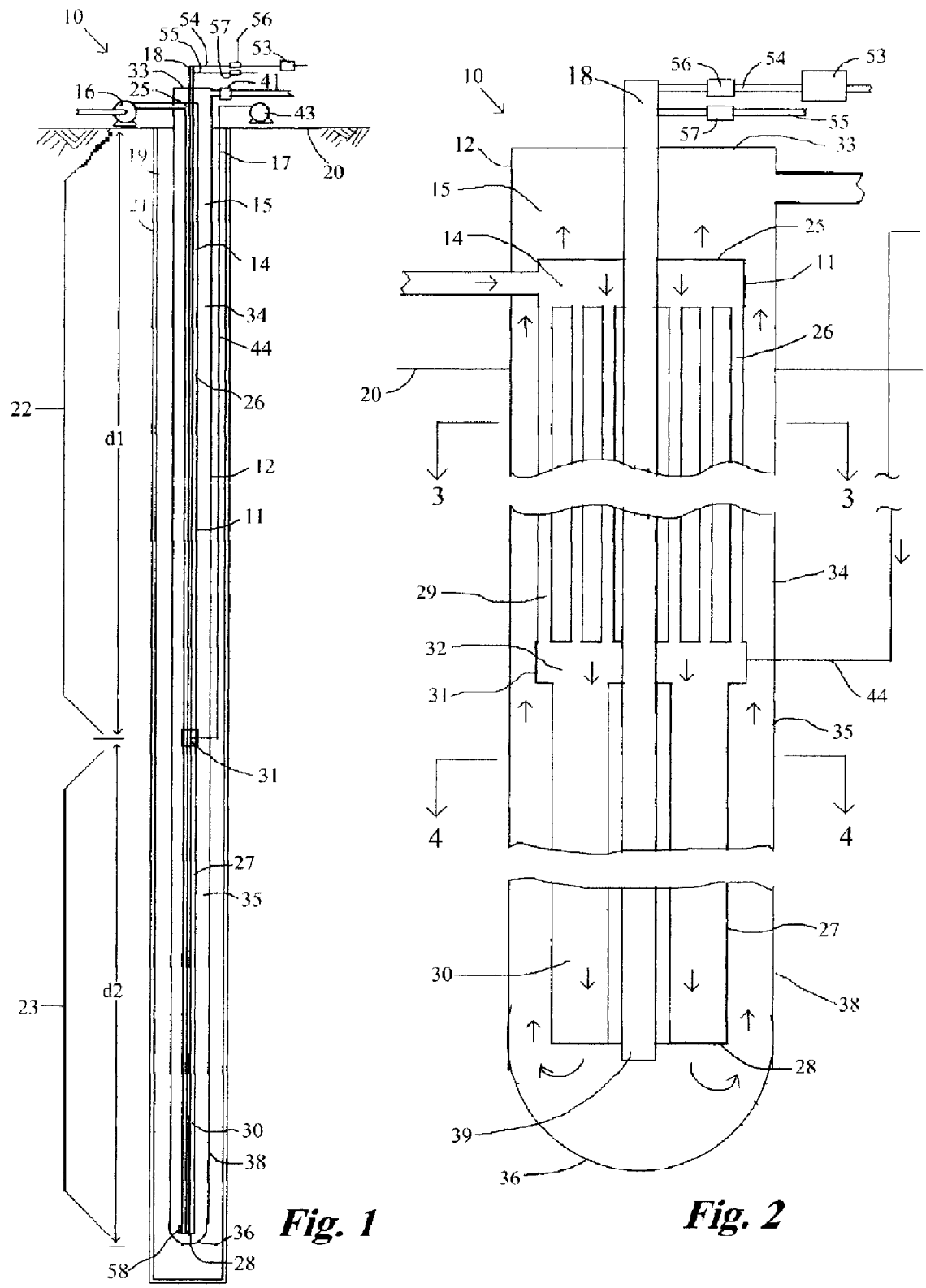
FIG. 1 is a schematic diagram of a reactor embodying features of the present invention.
FIG. 2 is a partial, enlarged cut-away side elevation view of the reactor of FIG. 1.

Referring now to FIGS. 1-4, a subsurface, thermally autogenous reactor 10 embodying features of the present invention includes a downgoing means 11 for defining a downgoing flow passage 14, an upgoing means 12 for defining an upgoing flow passage 15, a pump 16, an air injection system 17 and a heat exchanger 18. The upgoing and downgoing flow means 11 and 12 extend down a hole 19 in the earth a substantial depth below ground level 20. Preferably the reactor 10 is surrounded by an outer casing 21. The reactor 10 may be constructed in a cased well. The upgoing and downgoing means 11 and 12 are in counterflow heat exchange relation with each other, and are connected together at the bottom to form a subsurface, hydraulic U-tube structure. The reactor 10 includes a heat exchange zone 22 extending downwardly from the ground level 20 to a first depth d1, and a reaction zone 23 extending downwardly from the heat exchange zone 22 to a second depth d2.

The downgoing means 11 includes a top end 25, a downgoing heat exchange section 26 extending downwardly from the top end 25 through the heat exchange zone 22, an air injection section 31 extending downwardly from the downgoing heat exchange section 26, a downgoing reaction section 27 extending downwardly from the air injection section 31 through the reaction zone 23, and a bottom end 28. The downgoing heat exchange section 26, in the illustrated embodiment, includes a plurality of elongated, cylindrical spaced downgoing heat exchange tubes 29. Preferably the downgoing heat exchange section 26 includes at least three downgoing heat exchange tubes 29. The downgoing reaction section 27 includes at least one and preferably a plurality of elongated, cylindrical spaced downgoing reaction tubes 30. The downgoing reaction tubes 30 are connected to the downgoing heat exchange tubes 29 by the air injection section 31, shown as a manifold 32.

The upgoing means 12 includes a top end 33, an upgoing heat exchange section 34 extending downwardly from the top end 33 through the heat exchange zone 22, an upgoing reaction section 35 extending downwardly from the upgoing heat exchange section 34 through the reaction zone 23, and a bottom end 36. The upgoing means 12, in the illustrated embodiment, includes an elongated, cylindrical upgoing tube 38 with the bottom end 36 being closed, the upgoing tube 38 forming the reactor case for the reactor 10. The heat exchanger 18 has an elongated, cylindrical heat exchanger body 39 that extends down the center of the upgoing tube 38. The downgoing heat exchange tubes 29 are arranged in a spaced relationship, around the heat exchanger body 39, inside the upgoing tube 38. The downgoing heat exchange tubes 29 are arranged in one or more spaced concentric circles, the number of circles depending on the number of downgoing heat exchange tubes 29. The downgoing reaction tubes 30 are arranged in a spaced relationship, inside the upgoing tube 38 and around the heat exchanger body 39. The downgoing and upgoing means 11 and 12 can have other configurations. By way of example, and not as a limitation, the downgoing means 11 can include an outer tube with the upgoing means 12 including one or more inner tubes, or the downgoing and upgoing means 11 and 12 can be divided portions of a single tube.

The air injection system 17 includes an air compressor 43 at ground level 20 and an air flow line 44 that extends from the air compressor 43 to the manifold 32. The pump 16 connects to the top end 25 of the downgoing means 11 to pump fluid into the downgoing flow passage 14. The fluid flows down the downgoing heat exchange tubes 29. The air injection system 17 is connected to the manifold 32 and injects air into the downwardly flowing fluid at the manifold 32. The lower ends of the downgoing reaction tubes 30, which form the bottom end 28 of the downgoing means 11, are spaced above and open into the bottom end 36 of the upgoing means 12. Fluid mixed with air flows down the downgoing reaction tubes 30, out into the bottom end 36 of the upgoing means 12, and up the upgoing tube 38, around the outsides of the downgoing reaction tubes 30 and the downgoing heat exchange tubes 29. A pressure control device 41, such as a pressure regulator, connected to the top end 33 of the upgoing means 12 controls pressures and flow rates in the reactor 10.

The downgoing heat exchange section 26 has a selected first cross sectional area and the upgoing heat exchange section 34 has a selected second cross sectional area. The second cross sectional area is selected to be significantly greater than the first cross sectional area. The ratio of second cross sectional area to the first cross sectional area is selected based on the COD of the fluid the reactor processes. The fluid flow down the downgoing heat exchange section 26 is a single phase, liquid flow. With the injection of air into the fluid at the bottom of the downgoing heat exchange section 26, the fluid flow through the downgoing reaction section 27 and through the upgoing reaction and heat exchange sections 35 and 34 becomes a two phase flow of liquid and gas.

The two phase flow has a greater volume particularly in the upgoing heat exchange section 34 due to the decreasing pressure and corresponding gas expansion as the fluid nears the ground level 20.

The total depth of the reactor 10 is the sum of the first depth d1 and the second depth d2, and is generally from 3,000 to 6,000 feet, but may be greater in some applications. The first depth d1 of the of the heat exchange zone 22 is between about 200, for very low COD fluids, and 3,000 feet, for higher COD fluids. Air is injected into the downwardly flowing fluid at the first depth d1. The total depth, d1+d2, of the reactor 10 and the first depth d1 depend on the COD of the fluid intended to be processed in the reactor 10, and the reactor 10 should be tailored to the specific intended application. The COD is generally expressed as parts per million mass of oxygen required to oxidize the fluid. Preferably, the air is injected in the form of "Taylor bubbles".

The pressure at any point in the reactor 10 depends on the mass of fluid above and the pressure of pump 16. If only water were used, the pressure gradient would be about 0.43 psi per foot of depth. For a low COD fluid, the volume of air at atmospheric pressure required to react the fluid may be less than the volume of the fluid, while for a high COD fluid, the volume of air at atmospheric pressure required to react the fluid can be substantially greater than the volume of the fluid. Injection of the air at or near the ground level 20, at or around atmospheric pressure, will reduce the density of the downwardly flowing fluid and thereby reduce the hydrostatic head, even for a low COD fluid. It is not possible to inject the required air at or near the ground level 20 for high COD fluids without pressurizing the fluids to a high pressure. Such pressurizing requires high pressure liquid pumps capable of handling abrasive fluids.

A cubic foot of air at atmospheric pressure and room temperature contains about 0.0166 pounds of oxygen. At 786 psi a cubic foot of air contains about 0.8876 pounds of oxygen, or about 53 times the mass at atmospheric pressure. Since the air pressure must be greater than the pressure of the hydrostatic column of fluid at the point of injection, air at 786 psi is injected at about 1750 ft, where the pressure due to the hydrostatic column is about 750 psi. Since more oxygen can be added by injecting air at the bottom of the heat exchange zone 22, the production rate of a reactor 10 is increased. The increased oxygen produces more heat, improving the heat produced/heat loss ratio, so that useful heat can be withdrawn. Injecting air at the bottom of the heat exchange zone 22 provides a higher hydrostatic pressure at any depth so that the required depth of the reactor 10 can be decreased. The limit on the amount of air that can be injected is that the hydrostatic pressure at all levels below the point of injection must be greater than the vapor pressure of water.

The first depth d1, the depth of the injection section 31, is selected as follows. The COD of the fluid to be processed is determined and the degree of reaction of the reactants, up to 100%, is selected. Based on the COD and degree of reaction, the amount of required oxygen is determined. The ratio of air volume to liquid volume is selected. Based on this volumetric ratio, the required density of the oxygen containing air is calculated, and therefrom the required pressure of the injected air is calculated. The minimum first depth d1 is the depth at which the pressure due to the hydrostatic column in the downgoing heat exchange section 26 is slightly less than the required pressure.

The benefits of injecting air at the bottom of the heat exchange zone 22 will not be realized without the second cross sectional area being significantly greater than the first cross sectional area. The ratio of the second cross sectional area to the first cross sectional area is selected based on the COD of the intended material to be processed the in the reactor 10 and therefrom the relative mass of air to be injected.

Figure 3:
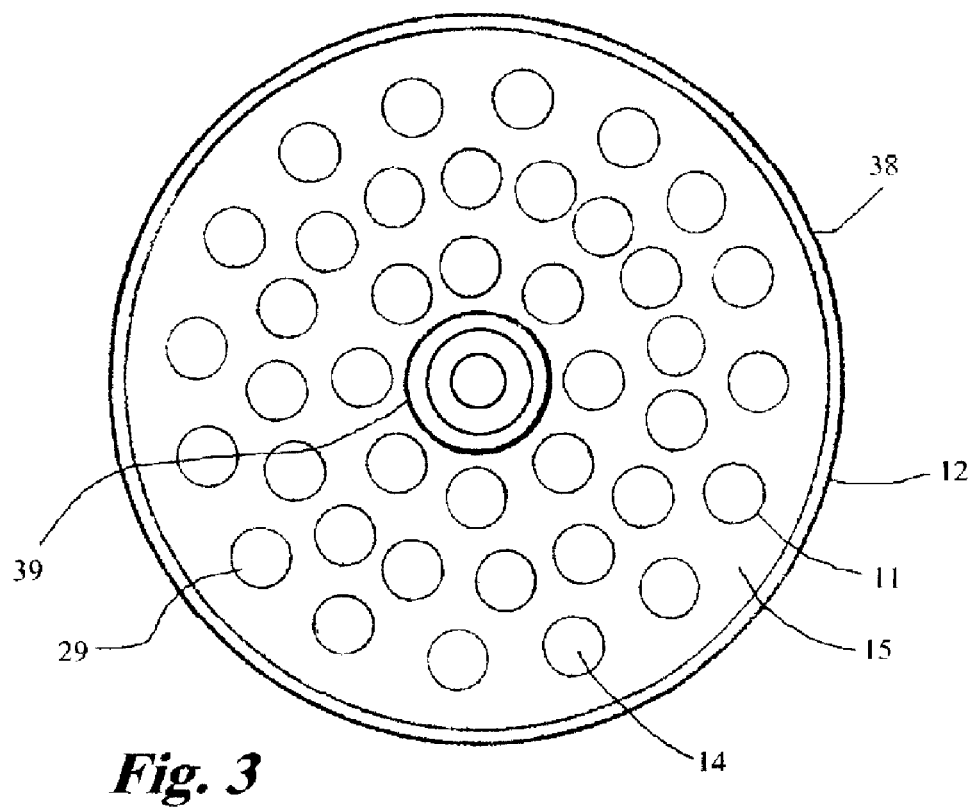
FIG. 3 is a sectional view taken along line 3-3 of FIG. 2.

The following specific dimensions and numbers are provided by way of example and not as a limitation. Referring to FIG. 3, the heat exchange zone 22 of the reactor 10 has an upgoing tube 38 with a seventeen inch diameter and a cross sectional area of 1.58 square feet. The heat exchanger body 39 has a 3.5 inch diameter and a cross sectional area of 0.0668 square feet. Thirty-six spaced downgoing heat exchange tubes 29 are arranged around the heat exchanger body 39, each having a 1.5 inch diameter and a cross sectional area of 1.7671 square inches. The first cross sectional area is 1.7671 square inches×36=0.4418 square feet. The second cross sectional area is (1.58−0.0668−0.4418)=1.0677 square feet. The ratio of the second cross sectional area to the first cross sectional area is 2.42.

The plurality of downgoing heat exchange tubes 29 increase the heat exchange surface area between the upgoing and downgoing heat exchange sections 34 and 26. A single downgoing heat exchange tube 29, arranged concentrically around the 3.5 inch heat exchanger body 39 and inside the 17 inch upgoing tube 38, with a cross section area equivalent to the thirty-six 1.5 inch downgoing heat exchange tubes 29, would have a diameter of about 9.66 inches. The surface area of the thirty-six 1.5 inch downgoing heat exchange tubes 29 is about 5.6 times the surface area of the equivalent single downgoing heat exchange tube. Since the total heat transfer is directly proportional to the surface area, the increased surface area between the upgoing and downgoing heat exchange sections 34 and 26 significantly increases the total heat transfer.

Figure 4:
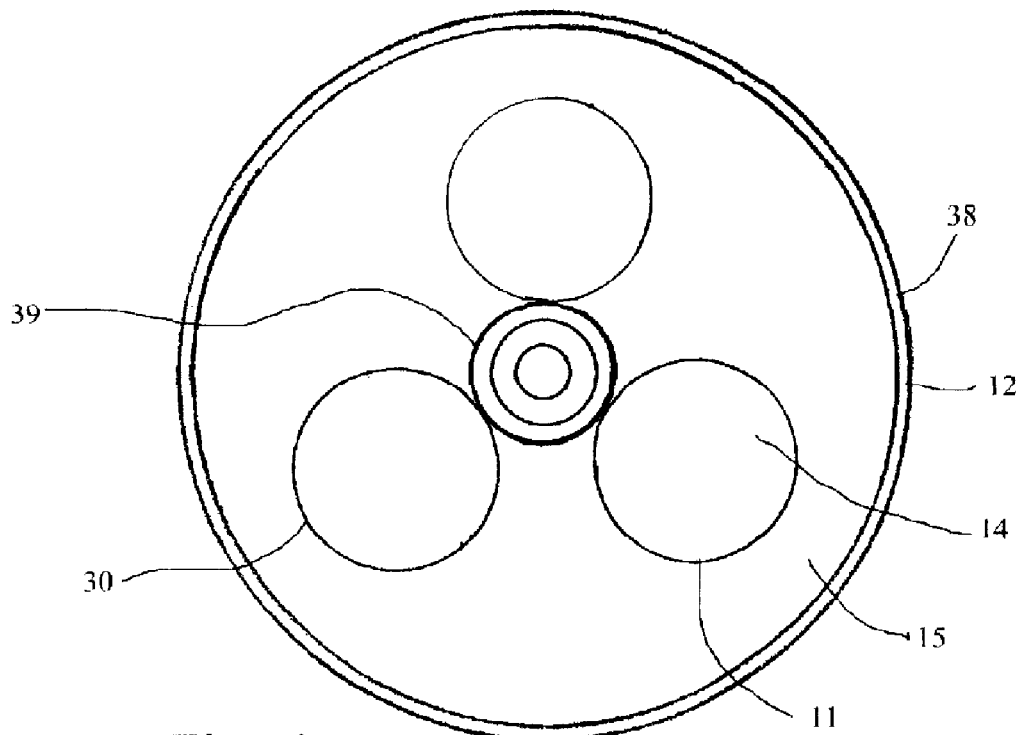
FIG. 4 is a sectional view taken along line 4-4 of FIG. 2.

Referring to FIG. 4, in the reaction zone 23 of the reactor 10, the upgoing tube 38 still has a seventeen inch diameter and a cross sectional area of 1.58 square feet, and the heat exchanger body 39 has a 3.5 inch diameter and a cross sectional area of 0.0668 square feet. Three spaced downgoing reaction tubes 30 are arranged around the heat exchanger body 39, each having a 5 inch diameter and a cross sectional area of 19.635 square inches. The cross sectional area of the downgoing reaction section 27 is 19.635 square inches×3=0.4091 square feet. The cross sectional area of the upgoing reaction section 35 is (1.58−0.0668−0.4091)=1.1004 square feet. The ratio of the cross sectional area of the upgoing flow passage 15 to the cross sectional area of the downgoing flow passage 14, in the reaction zone 23 is 2.69.

Figure 5:
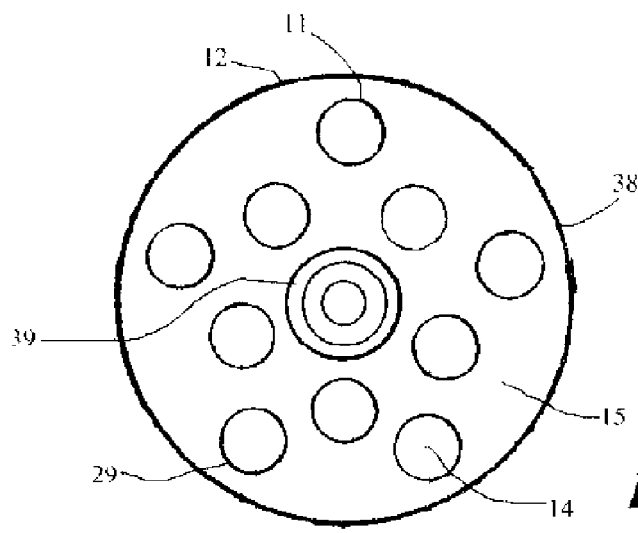
FIG. 5 is an alternative sectional view taken along line 3-3 of FIG. 2.

FIG. 5 shows an alternative arrangement for the heat exchange zone 22. The upgoing tube 38 has a ten inch diameter and a cross sectional area of 0.5454 square feet. The heat exchanger body 39 has a 2 inch diameter and a cross sectional area of 0.0218 square feet. Ten spaced downgoing heat exchange tubes 29 are arranged around the heat exchanger body 39, each having a 1.5 inch diameter and a cross sectional area of 1.7671 square inches. The first cross sectional area is 1.7671 square inches×10=0.1227 square feet. The second cross sectional area is (0.5454−0.0218−0.1227)=0.4009 square feet. The ratio of the second cross sectional area to the first cross sectional area is 3.2667.

A single downgoing heat exchange tube, arranged concentrically around the 2 inch heat exchanger body 39 and inside the 10 inch upgoing tube 38, with a cross section area equivalent to the ten 1.5 inch downgoing heat exchange tubes 29, would have a diameter of about 5.15 inches. The surface area of the ten 1.5 inch downgoing heat exchange tubes 29 is about 2.9 times the surface area of the equivalent single downgoing heat exchange tube.

Figure 6:
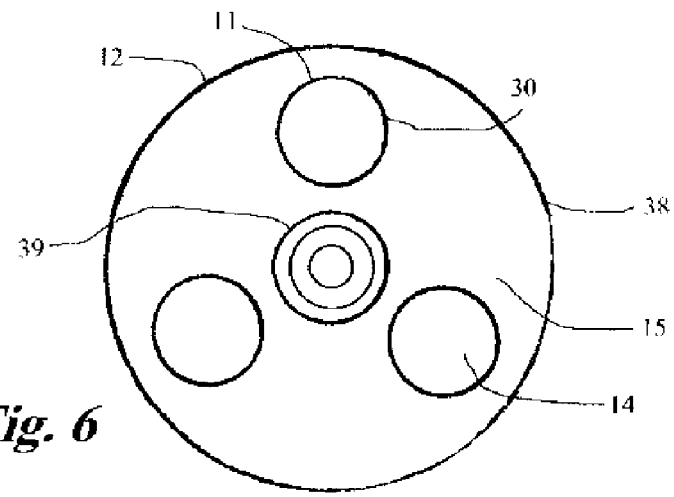
FIG. 6 is an alternative sectional view taken along line 4-4 of FIG. 2.

FIG. 6 shows an alternative arrangement for the reaction zone 23, for use with the heat exchange zone 22 of FIG. 5. The upgoing tube 38 still has a ten inch diameter and a cross sectional area of 0.5454 square feet, and the heat exchanger body 39 has a 2 inch diameter and a cross sectional area of 0.0218 square feet. Three spaced downgoing reaction tubes 30 are arranged around the heat exchanger tube 38, each having a 2.5 inch diameter and a cross sectional area of 4.9087 square inches. The cross sectional area of the downgoing reaction section 27 is 4.9087 square inches×3=0.1023 square feet. The cross sectional area of the upgoing reaction section 35 is (0.5454−0.0218−0.1023)=0.4213 square feet. The ratio of the cross sectional area of the upgoing flow passage 15 to the cross sectional area of the downgoing flow passage 14, in the reaction zone 23 is 4.12.

The diameter of the upgoing tube 38 and the depth of the reactor 10 are selected based on the specific application and corresponding COD, and the required throughput or capacity. The hydrostatic pressure must be sufficient to prevent boiling and geysering of the fluid at the desired temperature of reaction for the material being processed, thus determining the required depth. The diameter of the upgoing tube 38 is determined based on the depth, the required throughput and the desired dwell time in the reaction zone 22 to assure the required reaction. The number of downgoing heat exchange tubes 29 should be at least three and is limited only by the minimum feasible diameter for the downgoing heat exchange tubes 29. One or more downgoing reaction tubes 30 can be used.

Figure 7:
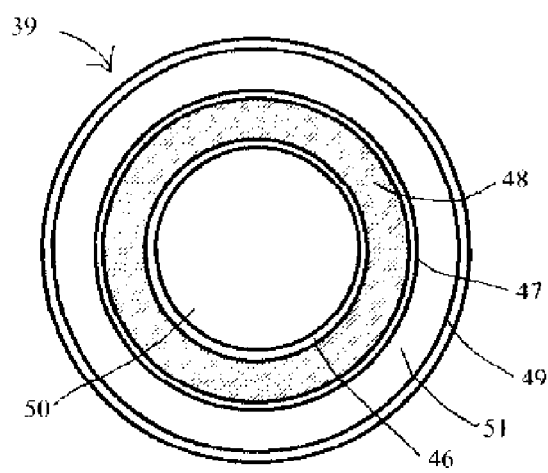
FIG. 7 is an enlarged sectional view of the heat exchanger taken along line 3-3 of FIG. 2.

Referring to FIG. 7, the heat exchanger body 39 includes a cylindrical inner tube 46, a cylindrical intermediate tube 47 arranged concentrically around and spaced outwardly from the inner tube 46, insulation 48 between the inner and intermediate tubes 46 and 47, and an outer tube 49 arranged concentrically around and spaced outwardly from the intermediate tube 47. The interior of the inner tube 46 defines a first passage 50 and the space between the intermediate and outer tubes 47 and 49 defines a second passage 51. The inner tube 46 is open at the bottom and the outer tube 49 is closed at the bottom to form a U-tube. As shown in FIG. 1, a heater 53 is connected to the heat exchanger body 39 above ground level 20 by a first flow line 54 that connects to the first passage 50. A second flow line 55 connects to the second passage 51.

First and second control valves 56 and 57, on the first and second flow lines 54 and 55, respectively, control the flow of fluid in and out of the heat exchanger body 39. During start-up of the reactor 10, fluid heated by the heater 53 flows in through the first flow line 54, down the first passage 50, up the second passage to provide heat to the reaction zone 22, and out through the second flow line 55. After the reaction in the reaction zone 22 becomes self-sustaining, the flow of fluid in the heat exchanger 18 is reversed, flowing in through the second flow line 55, down the second passage 51, up the first passage 50, and out through the first flow line 54 to recover heat from the reaction. The heat exchanger 18 controls the reaction temperature to prevent overheating, boiling and geysering. Preferably, for the reactor 10 of the present invention, as described above, the heat exchanger 18 is a water cooled design. Useful levels of superheated steam will be recoverable with the heat exchanger 18 due to the increased oxygen input and improved heat recovery of the reactor 10. At least one thermocouple 58 should be provided to monitor the temperature of the fluid at the bottom of the reactor 10, and preferably a plurality of thermocouples 58, spaced at selected depths, are be provided to monitor temperatures in the reactor 10.

Although the present invention has been described with a certain degree of particularity, it is understood that the present disclosure has been made by way of example and that changes in details of structure may be made without departing from the spirit thereof.

What is claimed is:

1. A subsurface, thermally autogenous reactor for effecting a wet oxidation of aqueous wastes, comprising:
    downgoing means for defining a downgoing flow passage, having a downgoing heat exchange section and a downgoing reaction section below said downgoing heat exchange section, said downgoing heat exchange section extending to a depth sufficient to form a hydrostatic column of said aqueous wastes having a pressure and temperature sufficient to allow said wet oxidation, said downgoing heat exchange section having a selected first cross sectional area,
    an air injection system connected to said downgoing means between said downgoing heat exchange and reaction sections for injecting compressed air which contains oxygen into said aqueous wastes and to cause said wet oxidation at a pressure that increases the mass of said oxygen to produce increased heat during said wet oxidation and,
    upgoing means for defining an upgoing flow passage in heat exchange relation to said downgoing means, and having an upgoing heat exchange section and an upgoing reaction section below said upgoing heat exchange section, said upgoing means being in flow communication with said downgoing means such that said aqueous wastes and air flowing down said downgoing means flows back up said upgoing means as a two phase fluid, said upgoing heat exchange section having a selected second cross sectional area that is selected to be significantly greater than said first cross sectional area to slow the velocity of said two phase fluid in said upgoing heat exchange section relative to the velocity of said aqueous wastes in said downgoing heat exchange section to provide a substantially maximum amount of heat transfer from said two phase fluid in said upgoing heat exchange section to said aqueous wastes in said downgoing heat exchange section, and
    whereby to sustain said wet oxidation without addition of heat from another source.

2. The reactor as set forth in claim 1 wherein said downgoing heat exchange section extends to a depth sufficient to form a hydrostatic column of said aqueous wastes having a pressure sufficient to inject compressed air containing oxygen at a density high enough to effect wet oxidation to a selected degree and to provide a selected volumetric ratio of said air to said aqueous wastes.

3. The reactor as set forth in claim 1 wherein said first and second cross sectional areas are selected considering flow velocities and heat transfer coefficients such that the transfer of heat from said upgoing heat exchange section to said downgoing aqueous waste in said down flowing heat exchange section is substantially maximized.

4. The reactor as set forth in claim 1 wherein said upgoing means includes an elongated, cylindrical upgoing tube, and said downgoing means includes at least one elongated, cylindrical downgoing tube inside said upgoing tube.

5. The reactor as set forth in claim 1 wherein said upgoing means includes an elongated, cylindrical upgoing tube, said downgoing heat exchange section includes a plurality of spaced, elongated, cylindrical downgoing heat exchange tubes inside said upgoing tube, and said downgoing reaction section includes at least one elongated, cylindrical downgoing reaction tubes inside said upgoing tube.

6. The reactor as set forth in claim 5 wherein said downgoing heat exchange section includes at least three downgoing heat exchange tubes.

7. The reactor as set forth in claim 5 including a reversible flow heat exchanger in spaced relation to said downgoing heat exchange tubes and said downgoing reaction tubes, and extending into said upgoing reaction section, for initiating said wet oxidation, controlling the temperature of said wet oxidation, and recovering excess heat from said wet oxidation.

8. The reactor as set forth in claim 1 including a pressure control device connected to said upgoing means to control pressures and flow rates in said downgoing and upgoing means.

9. The reactor as set forth in claim 1 wherein said downgoing and upgoing means extend to a depth of about 3,000 to 6,000 feet.

10. The reactor as set forth in claim 1 wherein said downgoing and upgoing heat exchange sections extend to a depth of about 200 to 3,000 feet.

11. A subsurface, thermally autogenous reactor for effecting a wet oxidation of aqueous wastes, comprising:
    downgoing means for defining a downgoing flow passage having a top end, a plurality of spaced, elongated, cylindrical downgoing heat exchange tubes below said top end, a plurality of spaced, elongated, cylindrical downgoing reaction tubes below said downgoing heat exchange tubes, and a bottom end, said downgoing heat exchange tubes extending to a depth sufficient to form a hydrostatic column of said aqueous wastes having a pressure and temperature sufficient to allow said wet oxidation, said downgoing means having a selected first cross sectional area,
    a pump for pumping said fluid into said top end of said downgoing flow passage,
    an air injection system connected to said downgoing means between said downgoing heat exchange and reaction sections for injecting compressed air which contains oxygen into said aqueous wastes and to cause said wet oxidation at a pressure that increases the mass of said oxygen to produce increased heat during said wet oxidation and,
    upgoing means for defining an upgoing flow passage in heat exchange relation to said downgoing means, and having a top end, an upgoing tube below said top end and around said downgoing heat exchange and reaction tubes, and a closed bottom end in flow communication with said bottom end of said downgoing means such that said aqueous wastes and air flowing down said downgoing and out said top end of said upgoing means, said upgoing means having a selected second cross sectional area, that is selected to be significantly greater than said first cross sectional area to slow the velocity of said two phase fluid in said upgoing heat exchange section relative to the velocity of said aqueous wastes in said downgoing heat exchange section to provide a substantially maximum amount of heat transfer from said two phase fluid in said upgoing heat exchange section to said aqueous wastes in said downgoing heat exchange section, and a reversible flow heat exchanger inside said upgoing tube, in spaced relation to said downgoing heat exchange tubes and said downgoing reaction tubes, said heat exchanger extending from said top end to near said bottom end of said upgoing means, for initiating said wet oxidation, controlling the temperature of said wet oxidation, and recovering excess heat from said wet oxidation, whereby to sustain said wet oxidation without addition of heat from another source.

12. A method of effecting a subsurface, thermally autogenous wet oxidation of aqueous wastes, comprising the steps of:

providing a downgoing flow passage, having a downgoing heat exchange section and a downgoing reaction section below said downgoing heat exchange section, said downgoing heat exchange section extending to a depth sufficient to form a hydrostatic column of said aqueous wastes having a pressure and temperature sufficient to allow said wet oxidation, said downngoing heat exchange section having a selected first cross sectional area, and providing an air injection system connected to said downgoing means between said downgoing heat exchange and reaction sections, injecting compressed air which contains oxygen into said aqueous wastes in said downgoing passage with said air injection system to cause said wet oxidation at a pressure that increases the mass of said oxygen to produce increased heat during said wet oxidation, providing an upgoing flow passage in heat exchange relation to said downgoing flow passage, and having an upgoing heat exchange section and an upgoing reaction section below said upgoing heat exchange section, said upgoing flow passage being in flow communication with said downgoing flow passage such that said aqueous wastes flowing down said downgoing flow passage flows back up said upgoing flow passage as a two phase fluid, said upgoing heat exchange section having a selected second cross sectional area that is selected to be significantly greater than said first cross sectional area to slow the velocity of said two phase fluid in said upgoing heat exchange section relative to the velocity of said aqueous wastes in said downgoing heat exchange section to provide a substantially maximum amount of heat transfer from said two phase fluid in said upgoing heat exchange section to said aqueous wastes in said downgoing heat exchange section, flowing said aqueous wastes down said downgoing flow passage and up said upgoing flow passage, transferring heat from said two phase fluid in said upgoing heat exchange section to said aqueous wastes in said downgoing heat exchange section sufficient to sustain said step of wet oxidation, whereby said wet oxidation is thermally autogenous.

13. The method as set forth in claim 12 wherein said downgoing heat exchange section extends to a depth sufficient to form a hydrostatic column of said fluid having a pressure sufficient to inject compressed air containing oxygen at a density high enough to effect wet oxidation to a selected degree and to provide a selected volumetric ratio of said air to said aqueous wastes.

14. The method as set forth in claim 12 wherein said step of transferring heat transfers a substantially maximum amount of heat from said two phase in said upgoing heat exchange section to said aqueous wastes in said downgoing heat exchange section.

15. The method as set forth in claim 12 wherein said upgoing flow passage is defined by an elongated, cylindrical upgoing tube, said downgoing heat exchange section is defined by a plurality of spaced, elongated, cylindrical downgoing heat exchange tubes inside said upgoing tube, and said downgoing reaction section is defined by at least one elongated, cylindrical downgoing reaction tubes inside said upgoing tube.

16. The method as set forth in claim 12 including the steps of:

providing a reversible flow heat exchanger extending into said upgoing reaction section initiating said step of reacting by adding heat to said fluid in said upgoing reaction section with said heat exchanger, controlling the temperature of said step of reacting with said heat exchanger, and recovering excess heat from said step of reacting with said heat exchanger.

17. The method as set forth in claim 12 including the step of providing a pressure control device connected to said upgoing flow passage to control pressures and flow rates in said downgoing and upgoing flow passages.

18. The method as set forth in claim 12 wherein said downgoing and upgoing flow passages extend to a depth of about 3,000 to 6,000 feet.

19. The method as set forth in claim 12 wherein said downgoing and upgoing heat exchange sections extend to a depth of about 200 to 3,000 feet.

* * * * *